United States Patent
Sorhuus et al.

(10) Patent No.: US 8,920,540 B2
(45) Date of Patent: Dec. 30, 2014

(54) COMPACT AIR QUALITY CONTROL SYSTEM COMPARTMENT FOR ALUMINIUM PRODUCTION PLANT

(71) Applicant: ALSTOM Technology Ltd

(72) Inventors: Anders Kenneth Sorhuus, Ski (NO); Odd Edgar Bjarno, Oslo (NO); Per-Erik Amundsen, Vear (NO)

(73) Assignee: ALSTOM Technology Ltd, Baden (CH)

( * ) Notice: Subject to any disclaimer, the term of this patent is extended or adjusted under 35 U.S.C. 154(b) by 60 days.

(21) Appl. No.: 13/852,517

(22) Filed: Mar. 28, 2013

(65) Prior Publication Data

US 2013/0327215 A1 Dec. 12, 2013

Related U.S. Application Data

(60) Provisional application No. 61/657,060, filed on Jun. 8, 2012.

(51) Int. Cl.
| | |
|---|---|
| *B01D 53/02* | (2006.01) |
| *C25C 3/22* | (2006.01) |
| *B01D 53/10* | (2006.01) |
| *B01D 53/50* | (2006.01) |
| *B01D 53/68* | (2006.01) |
| *B01D 53/83* | (2006.01) |

(52) U.S. Cl.
CPC . *C25C 3/22* (2013.01); *B01D 53/10* (2013.01); *B01D 53/508* (2013.01); *B01D 53/685* (2013.01); *B01D 53/83* (2013.01); *B01D 53/02* (2013.01); *B01D 2253/104* (2013.01); *B01D 2257/2047* (2013.01); *B01D 2257/302* (2013.01); *B01D 2258/025* (2013.01); *B01D 2251/304* (2013.01); *B01D 2251/404* (2013.01)

USPC .................................. 95/92; 95/131; 96/131

(58) Field of Classification Search
USPC ........................................ 95/92, 131; 96/131
See application file for complete search history.

(56) References Cited

U.S. PATENT DOCUMENTS

| | | | |
|---|---|---|---|
| 3,503,184 A | 3/1970 | Knapp et al. | |
| 3,664,935 A | 5/1972 | Johnson | |
| 4,501,599 A | 2/1985 | Loukos | |
| 5,332,562 A | 7/1994 | Kersey et al. | |
| 5,885,539 A | 3/1999 | Bjarno et al. | |
| 6,406,524 B1 | 6/2002 | Wedde | |
| 2013/0048508 A1* | 2/2013 | Wedde | 205/391 |

FOREIGN PATENT DOCUMENTS

| | | |
|---|---|---|
| EP | 2407228 A1 | 1/2012 |
| GB | 1441293 A | 6/1976 |

OTHER PUBLICATIONS

Search Report issued from European Patent Office dated Aug. 21, 2014 for EP Application No. 13170875.2.

* cited by examiner

*Primary Examiner* — Christopher P Jones

(57) ABSTRACT

A first contact reactor, mechanical separator device, one or more second contact reactors, silo, filter, one or more fans each equipped with one or more vibration dampers, an optional wet scrubber and stack are each integrated into a single compact air quality control system (AQCS) compartment. Additionally, a process gas cooling system may be integrated into the compact AQCS compartment. Benefits of the subject compact AQCS compartment includes footprint reduction, operating cost reduction from reduced pressure drop due to reduced ductwork, capital cost reduction from reduced ductwork, noise reduction, weather protection and increased adaptability to meet specific system requirements.

18 Claims, 10 Drawing Sheets

COMPACT AIR QUALITY CONTROL SYSTEM COMPARTMENT FOR ALUMINIUM PRODUCTION PLANT

CROSS-REFERENCE TO RELATED APPLICATION

This application claims the benefit of U.S. Provisional Patent Application Ser. No. 61/657,060; filed on Jun. 8, 2012, which is incorporated herein by reference in its entirety.

FIELD OF THE INVENTION

The present invention is related to a compact air quality control system compartment for use in an aluminium production plant. More specifically, the present invention is related to compact effluent gas cleaning equipment and process for removing pollutants from process effluent gases produced by electrolytic cells used in an aluminium production plant.

BACKGROUND OF THE INVENTION

In the process for electrolytic production of aluminium, such as by the Hall-Heroult process where aluminium is produced by reducing aluminium oxide in an electrolytic smelting pot filled with melted electrolyte in the form of a fluoride-containing mineral to which aluminium oxide is supplied, the process effluent gases comprise fluoride-containing substances such as hydrogen fluoride (HF) and fluorine containing dust. As these substances are extremely damaging to the environment, such must be separated before the process effluent gases may be discharged into the surrounding atmosphere. At the same time, the fluorine-containing melt is essential to the electrolytic process, and thus it is desirable to recover the compounds for recirculation to the electrolysis process. This recirculation may take place by absorption of the fluorine-containing substances on a particulate adsorbent.

As noted, the electrolytic reaction occurring in the electrolytic smelting pots produces process effluent gas in the form of hot, particle-laden effluent gas, typically cleaned in a gas cleaning unit before being discharged to the atmosphere. An example of a gas cleaning unit for cleaning the effluent gas generated in electrolytic smelting pots is disclosed in U.S. Pat. No. 5,885,539. The gas cleaning unit disclosed in U.S. Pat. No. 5,885,539 comprises a first contact reactor and a second contact reactor. The effluent gas from the electrolytic smelting pots is first forwarded to the first contact reactor and is, in the first contact reactor, brought into contact with recycled alumina. The partly cleaned effluent gas is then forwarded to the second contact reactor and is, in the second contact reactor, brought into contact with fresh alumina. The partly used alumina is recycled from the second contact reactor to the first contact reactor. A dust removal device removes the alumina from the effluent gas, which is then discharged to the atmosphere.

The system for recovery of the fluoride compounds comprises a filter system, which is included in a closed system. It is important to have stable transport of the gases from the aluminium production process to the filter system. This transport is accomplished in gas ducts where the gases, by means of large fans, are conveyed through the gas ducts, comprising main ducts and branch ducts, to the filter system. For each aluminium production cell a branch duct is brought into the main duct, the cross section of the main duct increases gradually, by means of diffusers as the gas quantity increases. It is very important for the process as well as the environment that the gas distribution is as even as possible, and traditionally this is achieved by an increasingly stronger throttling of the process gas in the branch duct the closer to the suction fans the branch duct is localized. Throttling represents sheer energy loss through a pressure drop.

Gas cleaning units for cleaning of process gases produced during electrolytic processing of aluminium include both centralized systems and decentralized systems. Centralized systems often include one or several halls comprising electrolytic cells whereby each hall may comprise between 70 and 150 electrolytic cells, with cleaning equipment arranged centrally between the halls or outside. The centralized system is connected with each of the cells by means of comprehensive and costly ductwork. Aluminum oxide used as adsorbent during the cleaning process is stored in separate silos before or after use in the cleaning process and thereafter transported back to each cell by means of transportation vehicles, cranes or other transportation system for aluminum, such as a system for transportation in a compact phase.

Decentralized systems are used to clean process gases from between 5 to 40 electrolytic cells, more preferably between 10 to 20 electrolytic cells. As such, less ductwork is required, and transportation needs for movement of aluminum oxide are greatly reduced. Large flexibility is achieved as to operation start up, and distance between aluminum oxide storage and the electrolytic cells may be minimized. Additional benefits achieved by decentralized systems are described in U.S. Pat. No. 6,406,524.

Although systems for cleaning process effluent gases produced during electrolytic processing of aluminium are known, improved systems that reduce operation costs, reduce equipment footprint, reduce capital costs, and/or increase adaptability to meet specific system requirements for larger production facilities, are still needed in the aluminium production industry.

SUMMARY OF THE INVENTION

Centralized air quality control systems (AQCS) for aluminium production plants normally require a plant central storage silo including a transport system, a silo for each AQCS, a dry scrubber for hydrogen fluoride (HF) removal, a wet scrubber for sulfur dioxide ($SO_2$) removal, fans, ductwork and stacks, each requiring separate footprints. According to the present invention, the hydrogen fluoride (HF) scrubber/contact reactor, optional sulfur dioxide ($SO_2$) scrubber, silo, fan, ductwork, filters and stack are each integrated into a single compact AQCS compartment. Additionally, a process gas cooling system may be integrated into the compact AQCS compartment. Benefits of the subject compact AQCS compartment includes footprint reduction, operating cost reduction from reduced pressure drop due to reduced ductwork, capital cost reduction from reduced ductwork due to compact size, noise reduction, weather protection of equipment, and increased adaptability to meet specific system requirements. As such, the subject compact AQCS compartment cleans process effluent gases produced by 41 to 300 production electrolytic cells.

It is an object of the present invention is to provide a compact AQCS compartment for removing gaseous pollutants from an effluent gas of an aluminium production electrolytic cell that is more efficient with respect to efficiency of removing pollutants from the effluent gas than that of the prior art system.

The above-noted object is achieved by a compact AQCS compartment for cleaning an effluent gas of at least one aluminium production electrolytic cell. The subject compact AQCS compartment comprises a first contact reactor (HF scrubber) in which the effluent gas is brought into contact with recycled alumina, a dust removal separator device in which at least a portion of the alumina having adsorbed pollutants from the effluent gas in the first contact reactor is separated from the effluent gas for return to the electrolytic cell. The compact AQCS compartment further comprises at least one second contact reactor in which the effluent gas forwarded from the dust removal separator device is brought into contact with fresh alumina from a silo for removing further pollutants from the effluent gas, the one or more second contact reactors being arranged on a higher vertical level than the dust removal separator device and that of the base first contact reactor.

An advantage of the above-described compact AQCS compartment is that a very efficient removal of pollutants, such as sulphur dioxide ($SO_2$), hydrogen fluoride (HF), and dust particles, from the effluent gas is obtained, both with regard to the removal efficiency as such, and with regard to the investment and operating costs of the compact AQCS compartment. A very compact AQCS compartment may be obtained, with minimal ductwork required, and with minimum effluent gas transport distances. The relatively short effluent gas transport distances result in relatively low compact AQCS compartment pressure drop and energy consumption.

According to one embodiment the one or more second contact reactors of the subject compact AQCS compartment is positioned at a point vertically higher than and beside the dust removal separator device. An advantage of this embodiment is that a very compact AQCS compartment is obtained, without sacrificing service and maintenance of the dust removal separator device.

According to one embodiment of the subject compact AQCS compartment, an alumina silo is arranged beside the dust removal separator device with an optional wet scrubber positioned over a fan, fan vibration dampers, filter, the one or more second contact reactors and at least a portion of the alumina silo to at least partly obscure the alumina silo when the optional wet scrubber is viewed from above. An advantage of this embodiment is that the silo is efficiently integrated in the compact AQCS compartment with the optional wet scrubber positioned above the alumina silo, which infrequently requires any maintenance work.

According to one embodiment the one or more second contact reactors are fluidly connected to a filter positioned vertically above the one or more second contact reactors, with a fan, fan vibration dampers, clean gas plenum and stack arranged vertically thereabove. The optional wet scrubber device may be optionally positioned vertically between the fan and the clean gas plenum. The one or more second contact reactors are fluidly connected to the filter, fan, clean gas plenum and stack via an outlet duct arranged in a side wall of the clean gas plenum. An advantage of this embodiment is that a combination of good serviceability with regard to the second contact reactors and compact arrangement with regard to short transport distances for the effluent gas, results in low compact AQCS compartment energy consumption.

According to one embodiment a fan equipped with vibration dampers is connected to an outlet duct of the clean gas plenum of the filter for the one or more second contact reactors, to cause a flow of effluent gas through the clean gas plenum to the optional wet scrubber and lastly the stack. An advantage of this embodiment is that the fan is integrated in the vertical top portion of the compact AQCS compartment for the flow of the effluent gas from the clean gas plenum to the optional wet scrubber. In the case of no optional wet scrubber, the flow of effluent gas from the clean gas plenum flows to the stack. In either case, no, or only limited, space is required for the fan and vibration dampers, thus achieving a very compact arrangement.

According to one embodiment a radial fan comprising an impeller rotating on a horizontal shaft, equipped with one or more vibration dampers that isolate vibrations from the fan to reduce fan vibrations travelling to the support structure by approximately 90 to 99 percent, receives effluent gas flowing in a horizontal direction from the clean gas plenum of the filter for the one or more second contact reactors and transports the effluent gas upward into the optional wet scrubber positioned thereabove prior to being released through a stack. An advantage of this embodiment is that the radial fan equipped with vibration dampers performs the dual functions of forwarding the flow of effluent gas from the clean gas plenum of the filter for the one or more second contact reactors to the optional wet scrubber and finally the stack, and of diverting the flow of effluent gas from a horizontal flow to an upward vertical flow.

According to one embodiment the filter, the fan with vibration dampers and the optional wet scrubber together form a common stacked unit, and are supported on a common support structure. An advantage of this embodiment is that the compact AQCS compartment is less complex, requires an overall smaller footprint and has a lower investment cost, since the number of required support structures is minimized.

According to one embodiment a compact AQCS compartment upper most portion or "penthouse" houses at least a part of a clean gas plenum from the filter, or optionally at least a part of the wet scrubber. An advantage of this embodiment is that the optional wet scrubber and the clean gas plenum (as well as the other equipment) are protected from, for example, wind loads, precipitation, sunlight, sand storms, and like weather conditions. As such, requirements with regard to suitable equipment material types and material dimensions may be lowered, thereby reducing required investment costs.

According to one embodiment a wet scrubber inlet opening for receiving effluent gas flowing from the filter for the one or more second contact reactors is arranged in a bottom of the wet scrubber. An advantage of this embodiment is that the wet scrubber can be arranged in very close proximity to the filter and one or more second contact reactors with the fan and vibration dampers positioned therebetween, since positioned at a level vertically above the level of the fan, vibration dampers, filter and one or more second contact reactors. Preferably, a gas distributor is arranged at the bottom of the wet scrubber for distributing effluent gas that enters the wet scrubber from below.

According to one embodiment a stack for discharging cleaned effluent gas is arranged on top of the optional wet scrubber or the fan with vibration dampers. An advantage of this embodiment is that the optional wet scrubber may also serve as a part of the stack. Furthermore, there is no need for long ducts to channel the flow of cleaned effluent gas to a remotely arranged stack. As such, investment, operating and maintenance costs are reduced.

A further object of the present invention is to provide a method of removing gaseous pollutants from an effluent gas of an aluminium production electrolytic cell that is more efficient with respect to removing pollutants from the effluent gas than is the method of the prior art.

This object is achieved by means of a method comprising: contacting effluent gas with alumina adsorbing at least a portion of the content of pollutants of the effluent gas in a first contact reactor; separating at least a portion of adsorbed pollutants from the effluent gas using a dust removal separator device; contacting effluent gas with alumina adsorbing an additional content of pollutants of the effluent gas in one or more second contact reactors positioned at a point vertically higher than that of said dust removal separator device; separating at least a portion of adsorbed pollutants from the effluent gas using a filter, such as a bag filter to produce cleaned effluent gas; drawing cleaned effluent gas with a fan equipped with a vibration dampers from the filter through a clean gas plenum for release through a stack.

An advantage of this method is that pollutants may be removed from the effluent gas in an efficient manner with respect to investment and operating costs, and with respect to the cleaned effluent gas purity level upon release from the compact AQCS compartment.

According to one method embodiment, the effluent gas from which at least a portion of the alumina has been separated is forwarded into a clean gas plenum arranged at the top of the filter device. The effluent gas flows horizontally out of the clean gas plenum before being diverted to flow vertically upward into an optional wet scrubber. An advantage of this embodiment is that a compact and efficient arrangement is obtained, which still enables maintenance of the filter device.

According to one method embodiment, the effluent gas flows upwardly and/or horizontally while being subjected to the steps of: contacting alumina; separating the alumina; contacting alumina; separating alumina; and optionally entering the wet scrubber, and contacting absorption liquid in the wet scrubber; during which steps the effluent gas flows upwardly in at least one of the steps. With the gas flowing upwardly, and optionally horizontally, for shorter distances, during the treatment steps, the effluent gas moves a relatively short total distance. Additionally, the gas does not move downwardly to any substantial extent during the treatment steps. Such reduces investment and operating costs by minimizing gas duct lengths and required fan power. Also, the method may be conducted in a compact AQCS compartment having a relatively smaller overall footprint.

Further objects and features of the present invention will be apparent from the following detailed description and claims.

BRIEF DESCRIPTION OF THE DRAWINGS

The invention will now be described in more detail with reference to the appended drawings in which.

DETAILED DESCRIPTION OF PREFERRED EMBODIMENTS

According to the present invention, an air quality control system (AQCS) hydrogen fluoride (HF) scrubber/contact reactor, sulfur dioxide ($SO_2$) wet scrubber (optional), filter, fan, silo, ductwork and stack are each integrated into a single compact AQCS compartment. Additionally, a process gas cooling system may be integrated into the subject compact AQCS compartment. An example of a suitable process gas cooling system is described in PCT/IB2011/001508 incorporated herein in its entirety by reference. Benefits of the subject compact AQCS compartment includes footprint reduction, operating cost reduction from reduced pressure drop due to reduced ductwork, capital cost reduction from reduced ductwork and compact size, noise reduction, protection of equipment from weather conditions, and increased adaptability to meet specific system requirements. The subject compact AQCS compartment cleans process gases produced by approximately 41 to 300 production electrolytic cells.

Figure 1:
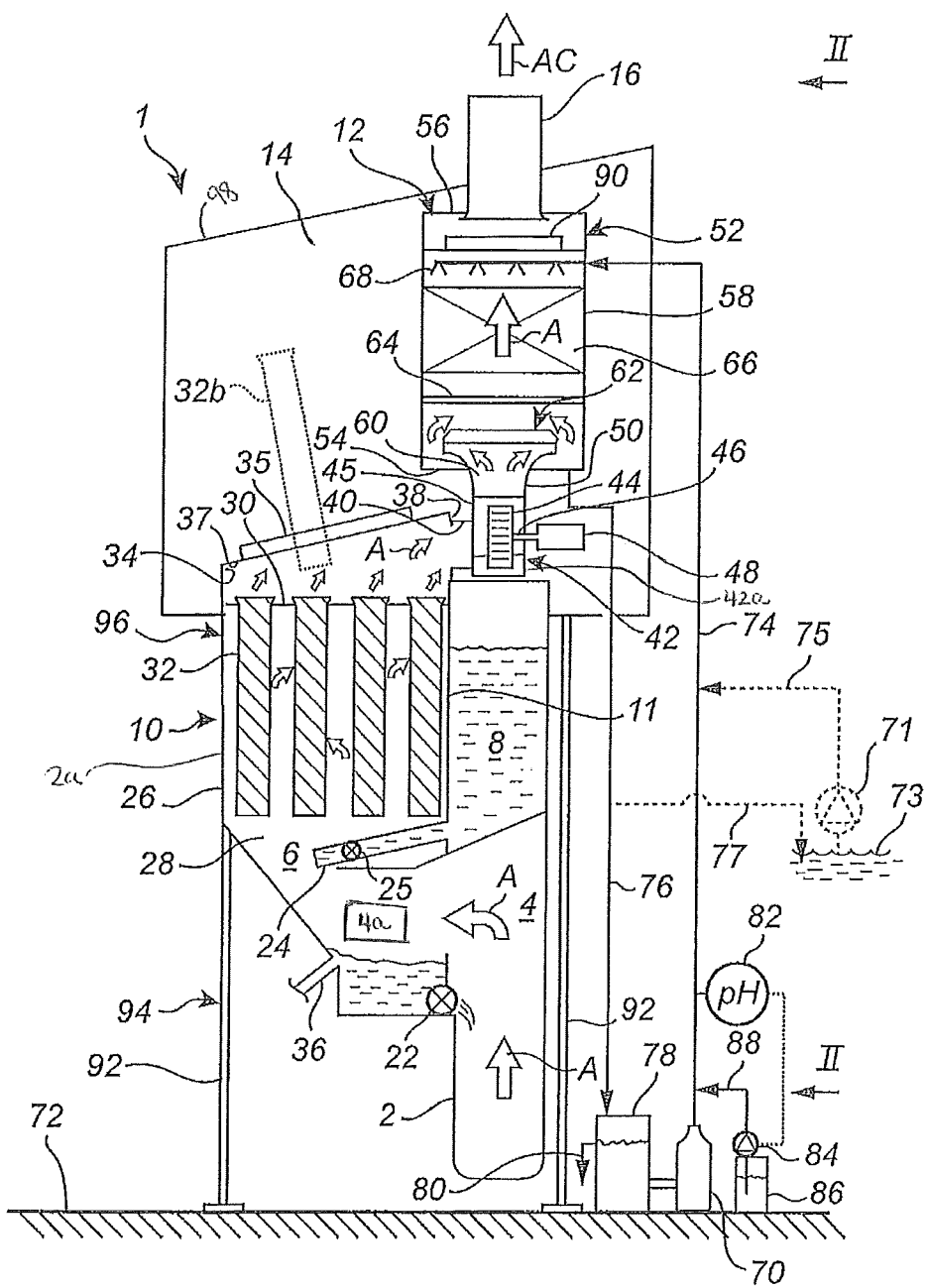
FIG. 1 is a schematic side view, in cross section, of a compact air quality control system compartment according to the present invention cleaning effluent gas from at least one aluminium production electrolytic cell.

FIG. 1 is a schematic representation of a compact AQCS compartment 1 in cross-section viewed from the side thereof. The compartment 1 comprises, as its main components, a gas inlet duct 2, a first contact reactor 4, an alumina separator device 4a, a second contact reactor 6, an alumina silo 8, a dust removal device 10, an optional wet scrubber 12, a gas cleaning unit penthouse 14, and a stack 16. Arrows A indicate the intended flow path of the effluent gas through compartment 1.

Figure 2:
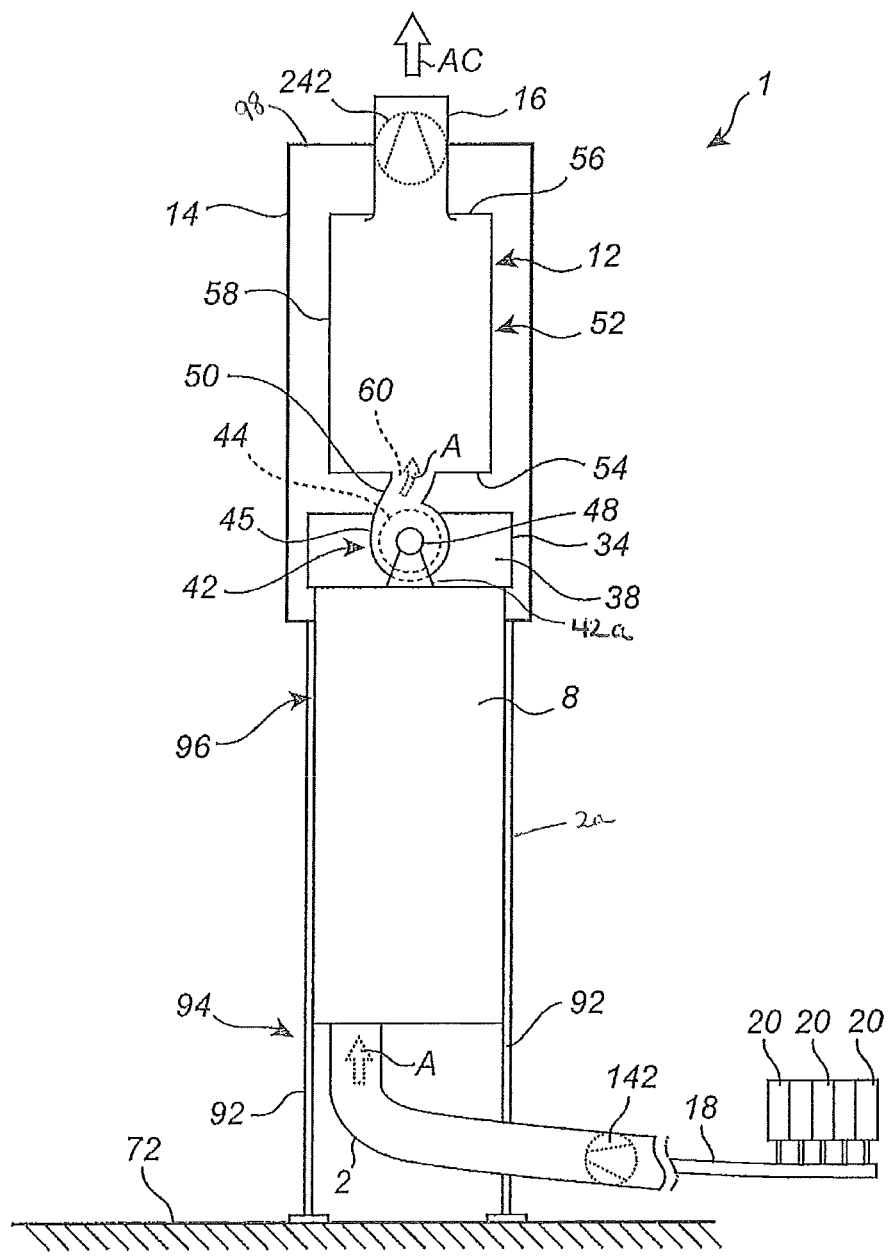
FIG. 2 is a schematic side view, in cross section, of the compact air quality control system compartment of FIG. 1, viewed in the direction depicted by arrows II-II in FIG. 1.

FIG. 2 illustrates compartment 1 viewed in the direction of arrows II-II of FIG. 1, i.e., as viewed from the side of FIG. 1. The gas inlet duct 2 is connected to a collecting duct 18, illustrated schematically and not drawn to scale, collecting effluent gas from each of, typically, 1 to 400, more typically 41 to 300, aluminium production electrolytic cells 20, each of which may be operative for producing aluminium in accordance with, for example, the above mentioned Hall-Héroult process.

Returning to FIG. 1, the gas inlet duct 2 channels the effluent gas flow from the aluminium production electrolytic cells 20 to the first contact reactor 4. A volumetric feeder 22 is operative for recirculating alumina ($Al_2O_3$) in the first contact reactor 4 to provide for efficient contact between the alumina and the effluent gas. As an effect of such contact, gaseous pollutants, such as hydrogen fluoride (HF) and sulphur dioxide ($SO_2$) are adsorbed by the alumina. The alumina is then separated from the effluent gas via a separator device 4a, such as a cyclone. Alumina separated by separator device 4a may be recycled to electrolytic cells 20.

The effluent gas then flows further to one or more second contact reactors 6. A supply pipe 24 with a volumetric feeder 25 is arranged for supplying fresh alumina to the second contact reactors 6 from the fluidly connected alumina silo 8. The fresh alumina effects a further adsorption of pollutants from the effluent gas onto the alumina. Preferably, the alumina silo 8 is arranged beside the dust removal device 10, to share a common vertical side wall 11. The optional wet scrubber 12 is arranged above the alumina silo 8 and at least partly obscures the view of alumina silo 8 when looking vertically downward from the top of the wet scrubber 12, as is clear from the combined perspectives of FIG. 1 and FIG. 2.

The effluent gas, comprising particles entrained from the aluminium production electrolytic cells 20, recycled alumina entrained from the first contact reactor 4 and not captured by separator device 4a, and fresh alumina entrained from the second contact reactor 6, flows to the dust removal device 10. The dust removal device 10 is arranged above the second contact reactors 6. The dust removal device 10 may, for example, be an electrostatic precipitator, the basic principle of which is known from, for example, U.S. Pat. No. 4,502,872, or a fabric filter, the basic principle of which is known from, for example, U.S. Pat. No. 4,336,035, each incorporated herein by reference in their entirety.

The dust removal device illustrated in FIG. 1 is a fabric filter 10. The fabric filter 10 comprises a housing 26. The effluent gas enters the housing 26 via an open lower end 28 thereof. A horizontal plate 30 is arranged in an upper end of the housing 26. Extending from plate 30 is a number of fabric filtering devices in the form of fabric bags 32, each such fabric bag 32 extending through a corresponding opening in the plate 30. Typically, a fabric filter 10 may comprise 2 to 40 000 such fabric bags 32. In operation, effluent gas, loaded with dust particles, including alumina, enters the open lower end 28 of the housing 26. The effluent gas passes through the fabric of the bags 32 and into the interior of the bags 32, while the dust particles are collected on the outside of the bags 32. Then, effluent gas, from which at least a portion of the dust particles have been separated, flows via the interior of the bags 32, upward through the plate 30, and enters a clean gas plenum 34 of the fabric filter 10. Occasionally, the collected dust particles are removed from the bags 32, for example by pulsing the bags 32 with pressurized air, in accordance with the principles disclosed in U.S. Pat. No. 4,336,035, or by shaking the bags 32. The dust particles thereby removed from the bags 32 are partly returned to the contact reactors 4, 6, and partly removed from the gas cleaning unit 1 via an outlet 36. The removed particles would normally be directly transported to the aluminium production electrolytic cells 20 illustrated in FIG. 2.

Continuing with the description of FIG. 1, the clean gas plenum 34, which is arranged at the top of the fabric filter 10, above the plate 30 and the bags 32, is provided, in a vertical side wall 38 thereof, with a horizontal outlet duct 40. The outlet duct 40 is fluidly connected to a fan 42, which in the example of FIG. 1 is a radial fan 42. The radial fan 42 is provided with an impeller 44 arranged within a housing 45 of the fan 42 and rotated by a horizontal shaft 46 driven by a motor 48. Fan 42 is also equipped with one or more vibration dampers 42a to isolate vibrations from the fan and thus reduce fan vibrations traveling to the support structure by approximately 90 to 99 percent. The effluent gas, flowing horizontally through the outlet duct 40, enters the radial fan 42 in the axial direction of the impeller 44 and is given an impulse in a vertical direction, radially of the impeller 44. The effluent gas is forwarded upwardly by fan 42 and leaves fan 42 substantially vertically via fan outlet 50.

It is important that fan 42 is equipped with one or more vibration dampers 42a. Vibration dampers 42a may comprise a plurality of seal springs or rubber components so as to isolate vibrations from the fan 42 from support structures by approximately 90 to 99 percent. Such is critical in the subject invention due to the location and operation of the fan 42 in the penthouse 14 or uppermost portion of the subject compact AQCS compartment 1.

FIG. 2 illustrates, schematically, two alternative locations of a fan, each equipped with vibration dampers. In accordance with a first alternative embodiment, a fan 142 may be arranged in the gas inlet duct 2. In accordance with a second alternative embodiment, a fan 242 may be arranged just after the wet scrubber 12. Fans 142, 242 could be utilized as alternatives to, or in combination with, fan 42 for generating a flow of effluent gas through the compact AQCS compartment 1.

The optional wet scrubber 12 comprises a housing 52. The housing 52 comprises a horizontal bottom 54, a horizontal roof 56, and a generally cylindrical side wall 58 extending between the bottom 54 and the roof 56. The housing 52 of the wet scrubber 12 is entirely located inside the penthouse 14 of the compact AQCS compartment 1. This means that the housing 52 of the wet scrubber 12 is protected from wind loads, UV-radiation, precipitation, sand storms, and like weather conditions, which substantially reduces the material and load requirements on the wet scrubber 12 housing 52.

The wet scrubber 12 housing 52 is arranged at a point above or vertically higher than and just beside the fabric filter 10, as is best illustrated in FIG. 1. Upon exchanging worn or damaged filter bags 32, the filter bags 32 may be removed through vertically upward movement thereof through hatches 35 arranged in the roof 37 of the clean gas plenum 34. A filter bag 32b, illustrated with dotted lines, indicates the position of the filter bag 32b during the removal/exchange thereof. By arranging the wet scrubber 12 housing 52 beside the fabric filter 10 clean gas plenum 34 the exchange of filter bags 32 is not obstructed by the housing 52. As can be seen from FIGS. 1 and 2, the wet scrubber 12 housing 52 is arranged just above the alumina silo 8.

The wet scrubber 12 bottom 54 is provided with an inlet opening 60, which is fluidly connected to the fan outlet 50. The inlet opening 60 is fluidly connected to a gas distributor 62, which distributes the gas coming from the fan 42 inside the housing 52 of the wet scrubber 12. An optional horizontal gas distribution grid 64 may be arranged above the gas distributor 62 inside the housing 52 to support the formation of an even gas distribution profile of the effluent gas inside the housing 52. Optionally, a gas-liquid contacting packing 66 may be arranged inside the housing 52, above the gas distributor 62 and gas distribution grid 64, to improve contact between effluent gas and an absorption liquid supplied via nozzles 68 arranged inside the housing 52, above the distributor 62, grid 64, and packing 66. Examples of such gas-liquid packing 66 include Mellapak™ available from Sulzer Chemtech AG, Winterthur, CH, and Pall™ rings available from Raschig GmbH, Ludwigshafen, Del. In accordance with one embodiment, the gas-liquid packing 66 may be a wooden packing made from a grid of wooden rods. A wooden packing makes it possible to operate the wet scrubber 12 without supply of absorption liquid for shorter periods of time, without causing damage to the packing material.

The absorption liquid would typically comprise water along with an alkali substance. The alkali substance may for example be sodium hydroxide (NaOH), sodium carbonate ($Na_2CO_3$), calcium hydroxide (CaOH), limestone ($CaCO_3$), or any other substance that is suitable for neutralizing the acid pollutants of the effluent gas, including for example, sulphur dioxide ($SO_2$) and hydrogen fluoride (HF) that are to be removed from the effluent gas by the wet scrubber 12. In accordance with a further embodiment, the absorption liquid comprising water along with an alkali substance could, at least in part, be supplied to the wet scrubber 12 in the form of seawater, for example in the form of seawater from a nearby ocean. When operating the scrubber 12 with seawater, the seawater would be passed through the wet scrubber 12 to absorb and neutralize sulphur dioxide and hydrogen fluoride from the effluent gas, after which the seawater would be returned to the ocean.

For example, the absorption and neutralization of sulphur dioxide and hydrogen fluoride from the effluent gas using sodium hydroxide (NaOH) could occur in accordance with the following reactions:

$$SO_2(g) + 2NaOH(aq) + \tfrac{1}{2}O_2(g) \rightarrow Na_2SO_4(aq) + H_2O \qquad [\text{eq. 1.1}]$$

$$HF(g) + NaOH(aq) \rightarrow NaF(aq) + H_2O \qquad [\text{eq. 1.2}]$$

A pump 70 is arranged on the ground 72 and is arranged for pumping absorption liquid via fluidly connected supply pipe 74 to the fluidly connected nozzles 68. The nozzles 68 atomize the absorption liquid and bring it into contact, optionally with the aid of the gas-liquid contacting packing 66, with the effluent gas flowing vertically upward inside the housing 52 of the wet scrubber 12. The spent absorption liquid is collected on the bottom 54 of the housing 52 and flows, via a fluidly connected pipe 76, to a circulation tank 78. The circulation tank 78 is fluidly connected to the pump 70 which returns the absorption liquid to the nozzles 68. An overflow pipe 80 is connected to the tank 78 for removing excess absorption liquid.

A pH measurement device 82 is connected to the pipe 74 for measuring the pH of the absorption liquid. The pH measurement device 82 controls a pump 84 which pumps an alkali solution, such as an NaOH solution, from a storage tank 86 to the pipe 74 via fluidly connected supply pipe 88. The pH measurement device 82 controls the pump 84 to keep the pH value in the absorption liquid supplied to the nozzles 68 via fluidly connected pipe 74 at a predetermined value, for example at pH 6.5.

In accordance with an alternative embodiment, a pump 71 is arranged for pumping seawater, having a pH of, for example, around 7.5 to 8.5, from a nearby ocean 73 to the supply pipe 74 via fluidly connected pipe 75. The seawater is utilized as an absorption liquid in the wet scrubber 12 to absorb and neutralize sulphur dioxide and hydrogen fluoride in accordance with reactions that are similar to those described hereinbefore with regard to NaOH. After such absorption and neutralisation, the seawater is returned to the ocean 73 via pipe 76 and fluidly connected pipe 77. Optionally, some fresh water, or some recirculated seawater, may be circulated in the wet scrubber 12, together with the supply of fresh seawater from the ocean 73.

A droplet eliminator 90 is arranged vertically above the nozzles 68. The droplet eliminator 90 removes any droplets contained in the effluent gas before allowing the effluent gas to enter the stack 16. The cleaned effluent gas, illustrated by means of an arrow AC, leaves the stack 16 and is discharged into the atmosphere.

The compact AQCS compartment 1 is supported on stands 92 forming together a common support structure 94. The contact reactors 4, 6, the fabric filter 10, and the wet scrubber 12, except ancillary equipment such as pump 70 and tank 78, together form a common stacked unit 96 which is supported by the common support structure 94 being common to the contact reactors 4, 6, the fabric filter 10, and the wet scrubber 12. In the embodiment of FIGS. 1 and 2, the alumina silo 8, the penthouse 14, and the stack 16 also form part of the stacked unit 96, and are supported by the common support structure 94. As is clear from a reference to FIGS. 1 and 2 the entire compact AQCS compartment 1 has a very small footprint with the optional wet scrubber 12 being arranged on a higher vertical level than the fabric filter 10, and above the alumina silo 8. Furthermore, the outlet duct 40 forwarding the effluent gas from the fabric filter 10 to the wet scrubber 12 is very short, typically only 0.1 to 2 m. Still further, the stack 16 is also very short, since it is arranged directly on top of the housing 52 of the wet scrubber 12, which is already located on a considerable height above the ground 72.

A method of cleaning effluent gas in the compact AQCS compartment 1 involves introducing the effluent gas via the gas inlet duct 2. The effluent gas is brought into contact with recycled alumina particles in the first contact reactor 4 causing adsorption of hydrogen fluoride and sulphur dioxide on the alumina particles. A further adsorption occurs in one or more second contact reactors 6. The effluent gas is then filtered in the fabric filter 10. Such filtering causes a removal of entrained dust particles and alumina laden with hydrogen fluoride and sulphur dioxide. The filtered effluent gas is then forwarded from the clean gas plenum 34 of the fabric filter 10 and is almost immediately introduced in the optional wet scrubber 12 via the inlet opening 60 thereof. Inside the housing 52 of the wet scrubber 12 the effluent gas is brought into contact with an absorption liquid causing a further removal of sulphur dioxide and hydrogen fluoride. The cleaned effluent gas is discharged to the atmosphere via a stack 16 arranged immediately on top of the wet scrubber 12 housing 52.

Hereinbefore, it has been described that the effluent gas enters the optional wet scrubber 12 housing 52 via an inlet opening 60 in the bottom 54 of the wet scrubber 12. It will be appreciated that an inlet opening may also be arranged in other positions at the wet scrubber 12 housing 52. For example, an inlet opening may be arranged in a lower portion of the wet scrubber 12 cylindrical side wall 58. Still further, an inlet opening may be arranged in that position on the wet scrubber 12 housing 52 where bottom 54 is joined to side wall 58.

Hereinbefore, it has been described that the optional wet scrubber 12 is provided with a packing 66. It will be appreciated that the wet scrubber 12 may also be designed without any packing, in which case the mixing of absorption liquid and effluent gas relies on the atomization of absorption liquid by nozzles 68. An example of a useful nozzle 68 is the Whirl-Jet™ nozzle available from Spraying Systems Co, Wheaton, Ill., USA. It will be appreciated that nozzles 68 could be arranged in several different vertical levels inside the wet scrubber 12 housing 52. Furthermore, the nozzles 68 could be arranged to spray the liquid counter-current, as illustrated in FIG. 1, co-current, or both counter-current and co-current, in relation to the flow of effluent gas.

Hereinbefore it has been described that the gas cleaning unit 1 comprises a first and a second contact reactor 4, 6 in which the effluent gas is brought into contact with alumina. It will be appreciated that a gas cleaning unit could also, in accordance with an alternative embodiment, be provided with a single contact reactor, in which the effluent gas is brought into contact with recirculated and fresh alumina. In accordance with a further alternative embodiment, a gas cleaning unit could be provided with three or more contact reactors arranged in series.

Hereinbefore it has been described that the fan 42 is a radial fan. It will be appreciated that other types of fans, for example axial fans, could also be utilized for forwarding the effluent gas through the compact AQCS compartment 1.

Hereinbefore it has been described that the pump 70, tank 78 and pH adjustment equipment 82, 84, 86, 88 are all arranged on the ground 72. It will be appreciated that it would also be possible to arrange some or all of these devices in another location. In accordance with one embodiment, at least one of the pump 70, the tank 78, the associated pipes 76, 74, and the pH adjustment equipment 82, 84, 86, 88 is arranged inside the compact AQCS compartment 1 penthouse 14. In accordance with a further embodiment, the pump 70, the tank 78, the associated pipes 76, 74, and the pH adjustment equipment 82, 84, 86, 88 are all arranged inside the penthouse 14.

Hereinbefore it has been described that the alumina silo 8 is integrated in the compact AQCS compartment 1. It will be appreciated that it is also possible to design a compact AQCS compartment 1 having no alumina silo 8 integrated therein. In such a case, fresh alumina may be supplied from a remote central alumina storage, fluidly connected to supply pipe 24.

Hereinbefore, the compact AQCS compartment 1 has been described as comprising one fabric filter 10, and one wet scrubber 12. It will be appreciated that a compact AQCS compartment could be provided with several parallel fabric filters, for example 2 to 100 parallel fabric filters, and a number of parallel wet scrubbers, for example 2 to 100 parallel wet scrubbers. The number of wet scrubbers need not correspond to the number of fabric filters. Hence, for example, two parallel fabric filters could be fluidly connected to one common wet scrubber.

Figure 3:
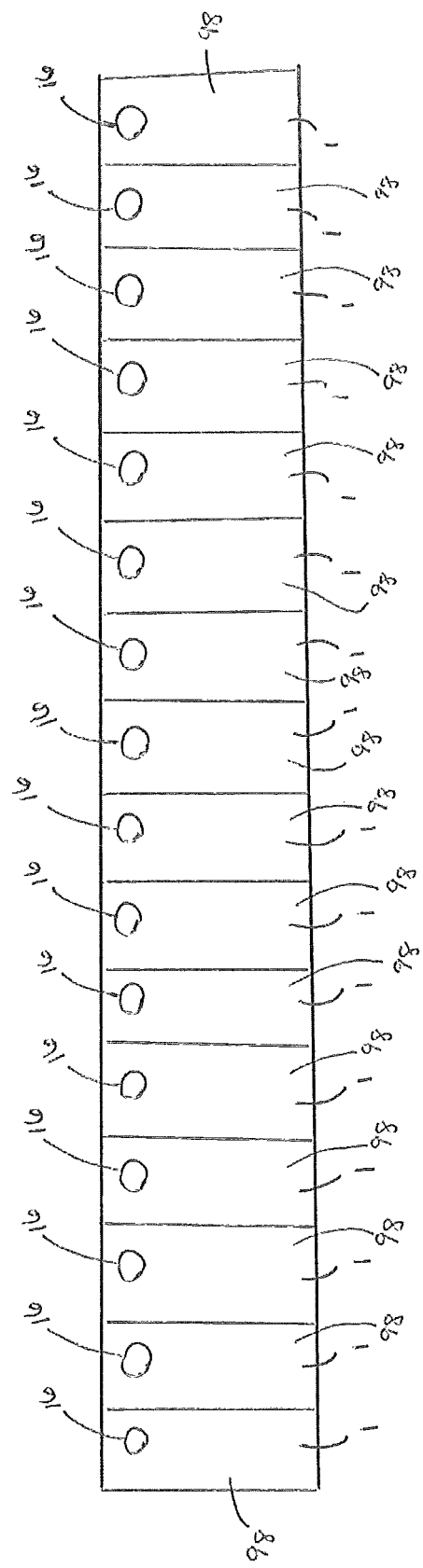
FIG. 3 is a top view of a single line of compact air quality control system compartments according to that of FIG. 1.

Referring now to FIG. 3, is a top view of a single line of sixteen compact AQCS compartments 1 according to that of FIG. 1. As such, only a roof 98 and a stack 16 of each compact AQCS compartment 1 is visible.

Figure 4:
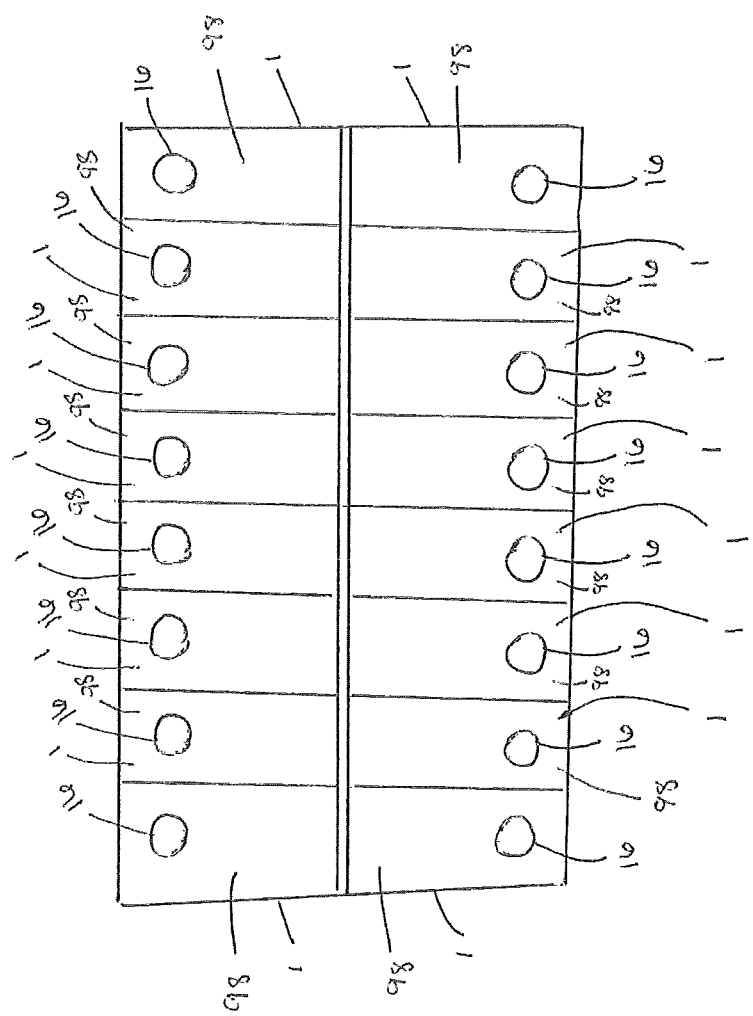
FIG. 4 is a top view of a double line of compact air quality control system compartments according to that of FIG. 1.

Referring now to FIG. 4, is a top view of a double line of eight compact AQCS compartments 1 according to that of FIG. 1. As such, only a roof 98 and a stack 16 of each compact AQCS compartment 1 is visible.

Figure 5:
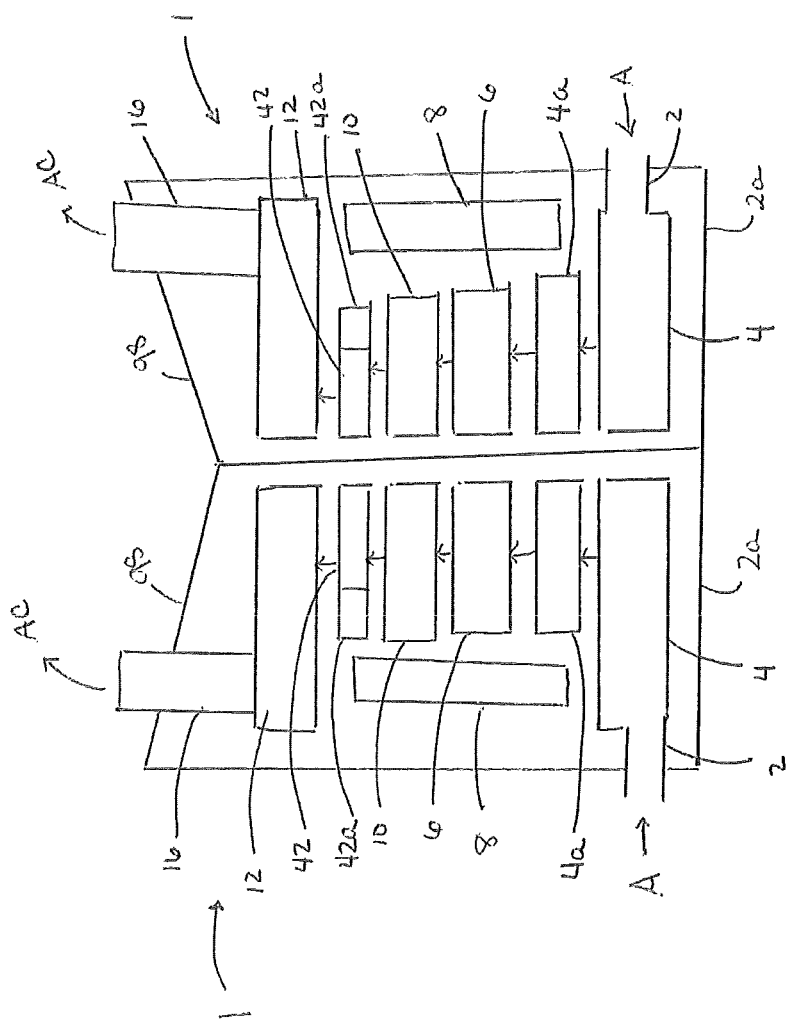
FIG. 5 is a side schematic view of a double line of compact air quality control system compartments according to that of FIG. 1.

Referring now to FIG. 5, is a side schematic view of a double line of compact AQCS compartments 1 according to that of FIG. 1. Each of the illustrated compact AQCS compartments 1 illustrated in FIG. 5 comprise an inlet duct 2, a first contact reactor 4, separator device 4a, second contact reactors 6, filter 10, fan 42 with vibration dampers 42a, optional wet scrubber 12 and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1.

Figure 6:
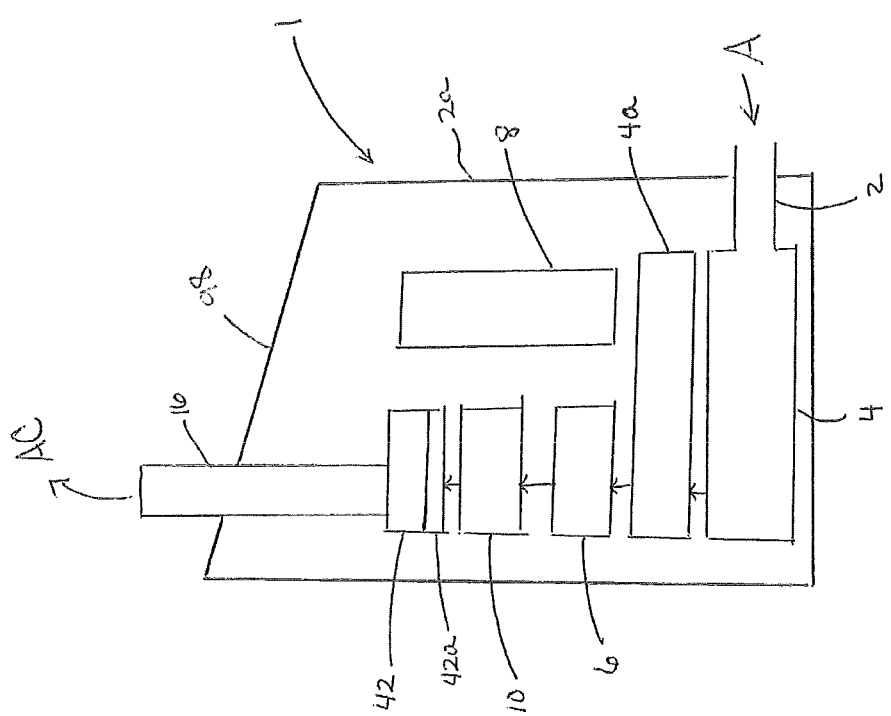
FIG. 6 is a side schematic view of a single line compact air quality control system compartments according to a second embodiment.

Referring now to FIG. 6, is a side schematic view of a single line of compact AQCS compartments 1 according to another embodiment. The illustrated compact AQCS compartment 1 illustrated in FIG. 6 comprises an inlet duct 2, a first contact reactor 4, separator device 4a, second contact reactors 6, filter 10, fan 42 with vibration dampers 42a and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1.

Figure 7:
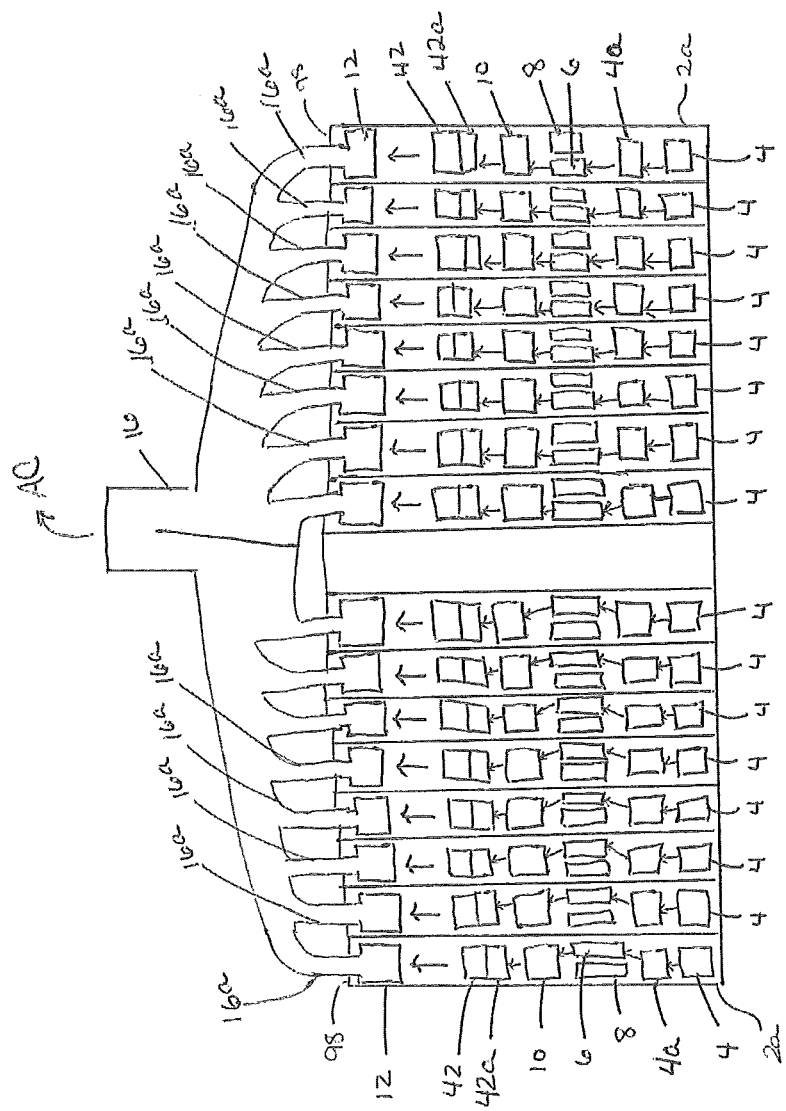
FIG. 7 is a side schematic view of a single line of compact air quality control system compartments according to a third embodiment.

Referring now to FIG. 7, is a side schematic view of a single line of sixteen compact AQCS compartments according to another embodiment. Each of the illustrated compact AQCS compartments 1 illustrated in FIG. 7 comprise an inlet duct (not shown), a first contact reactor 4, separator device 4a, second contact reactors 6, filter 10, fan 42 with vibration dampers 42a, optional wet scrubber 12, cleaned gas plenum 16a and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1. As an option for this embodiment, a wet scrubber 12 may be arranged in an area below the shared stack 16.

Figure 8:
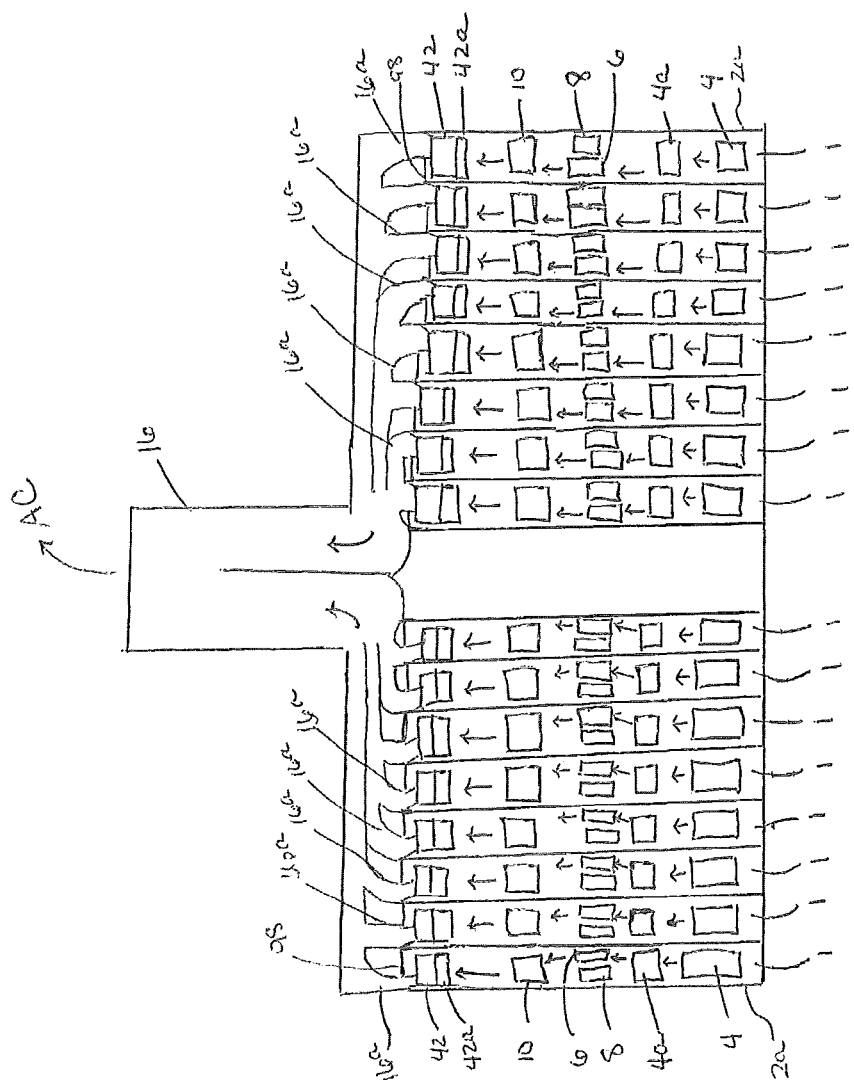
FIG. 8 is a side schematic view of a single line of compact air quality control system compartments according to a fourth embodiment.

Referring now to FIG. 8, is a side schematic view of a single line of sixteen compact AQCS compartments 1 according to another embodiment. Each of the illustrated compact AQCS compartments 1 illustrated in FIG. 8 comprise an inlet duct (not shown), a first contact reactor 4, separator device 4a, second contact reactors 6, filter 10, fan 42 with vibration dampers 42a, cleaned gas plenum 16a and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1. As an option for this embodiment, a wet scrubber 12 may be arranged in an area below the shared stack 16.

Figure 9:
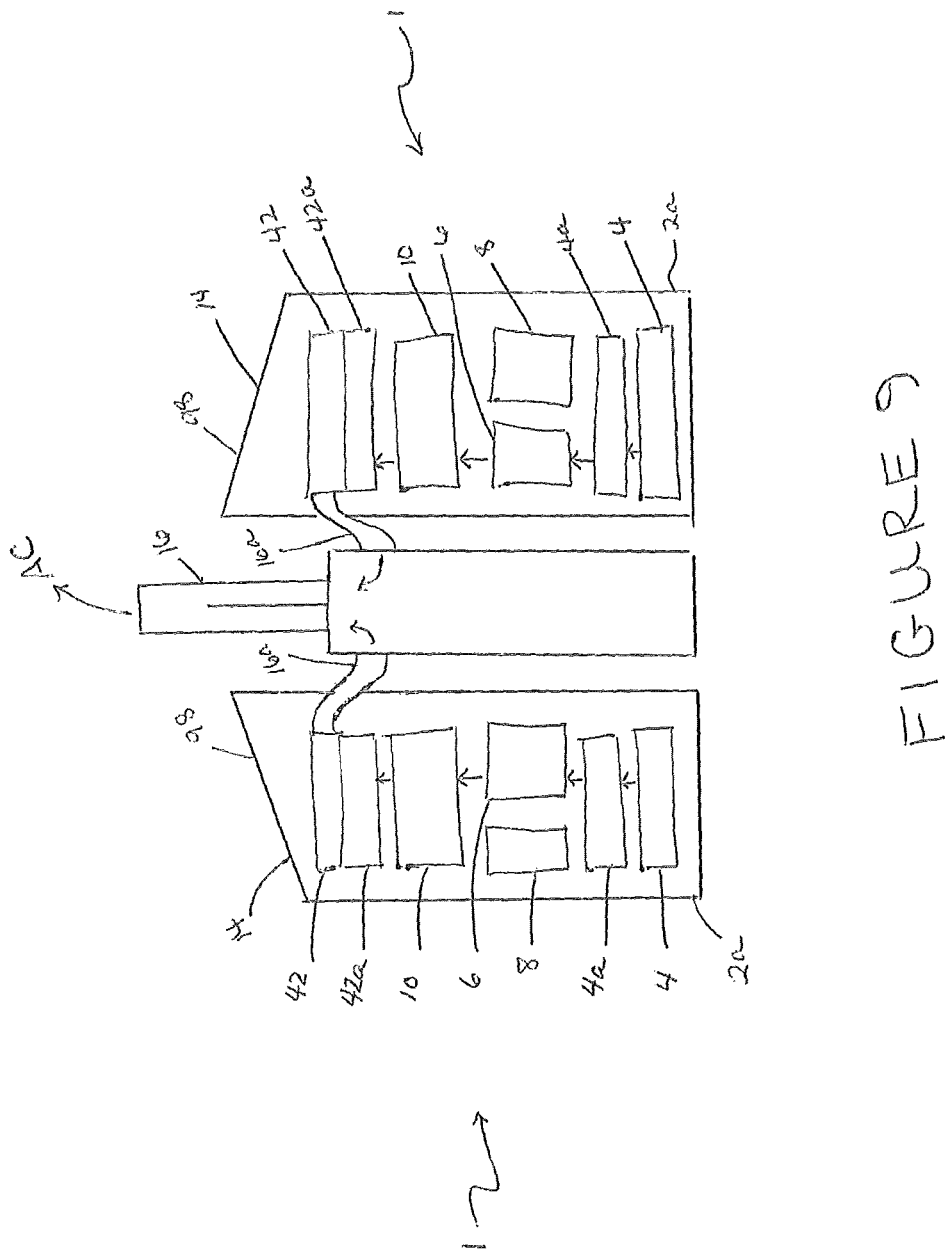
FIG. 9 is a side schematic view of a double line of compact air quality control system compartments according to a fifth embodiment.

Referring now to FIG. 9, is a side schematic view of a double line of compact AQCS compartments 1 according to another embodiment. Each of the illustrated compact AQCS compartments 1 illustrated in FIG. 9 comprise an inlet duct (not shown), a first contact reactor 4, separator device 4a, second contact reactors 6, filter 10, fan 42 with vibration dampers 42a, cleaned gas plenum 16a and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1. As an option for this embodiment, a wet scrubber 12 may be arranged in an area below the shared stack 16.

Figure 10:
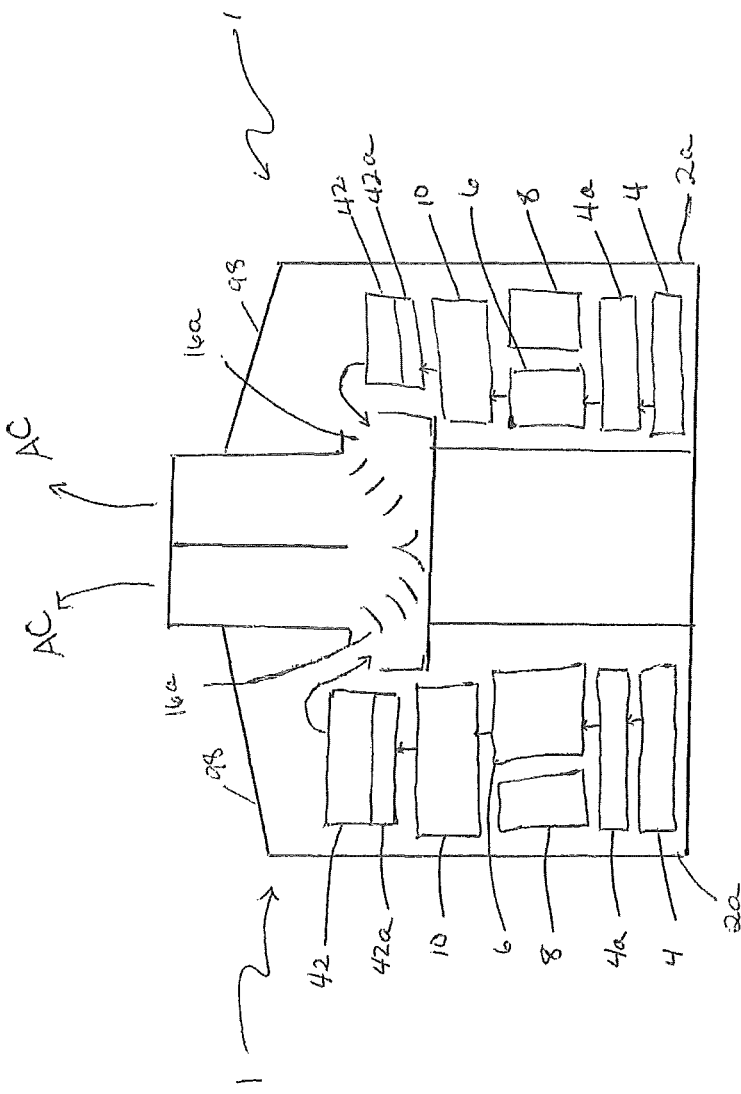
FIG. 10 is a side schematic view of a double line of compact air quality control system compartments according to a sixth embodiment.

Referring now to FIG. 10, is a side schematic view of a double line of compact AQCS compartments 1 according to another embodiment. Each of the illustrated compact AQCS compartments 1 illustrated in FIG. 10 comprise an inlet duct (not shown), a first contact reactor 4, separator device 4a, second contact reactors 6, filter 10, fan 42 with vibration dampers 42a, cleaned gas plenum 16a and stack 16, fluidly connected for flow of effluent gases through compact AQCS compartment 1. Also provided in compact AQCS compartment 1 housing 2a is silo 8 for alumina used in contact reactors 4 and 6 as described above with regard to FIG. 1. As an option for this embodiment, a wet scrubber 12 may be arranged in an area below the shared stack 16.

To summarize, a compact AQCS compartment 1 for cleaning an effluent gas of at least one aluminium production electrolytic cell comprises contact reactors 4, 6 in which the effluent gas is brought into contact with alumina, and a dust removal device 10 for removing at least a portion of the alumina. The compact AQCS compartment 1 further comprises an optional wet scrubber 12 in which the effluent gas is brought into contact with an absorption liquid containing water for removing further pollutants from the effluent gas. The wet scrubber 12 is positioned at a point vertically higher than that of the dust removal device 10.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A compact air quality control system compartment comprising:
    each of the following vertically arranged one above another and fluidly connected within a single housing:

a first contact reactor fluidly connected with an electrolytic cell;

a separator device;

one or more second contact reactors with a fluidly connected silo;

a filter system;

a fan equipped with vibration dampers for vibration isolation; and a stack in fluid communication with the atmosphere.

2. The compartment of claim 1 wherein said first contact reactor is arranged for supply of adsorbent from said second contact reactors.

3. The compartment of claim 1 wherein said separator device supplies separated adsorbent to said electrolytic cell.

4. The compartment of claim 1 wherein said second contact reactors are arranged for supply of adsorbent from said associated silo.

5. The compartment of claim 1 wherein said vibration dampers reduce fan vibrations by approximately 90 percent.

6. The compartment of claim 1 further comprising a wet scrubber arranged vertically between said fan and said stack.

7. The compartment of claim 1 wherein said vibration dampers comprise a plurality of seal springs.

8. The compartment of claim 1 wherein said vibration dampers comprise rubber components.

9. The compartment of claim 1 wherein said vibration dampers isolate vibrations from said fan for vibration reduction.

10. A method of treating process effluent gases from an electrolytic cell in a compact AQCS compartment, said method comprising:

passing process effluent gases from said electrolytic cell through said compartment comprising each of the following vertically arranged one above another and fluidly connected within a single housing: a first contact reactor with an adsorbent, a separator device for removal of adsorbent, one or more second contact reactors with a fluidly connected silo with an adsorbent, a filter for dust and adsorbent collection to produce cleaned gas, a fan equipped with vibration dampers for vibration isolation, and a stack fluidly connected with the atmosphere for cleaned gas release.

11. The method of claim 10 wherein said absorbent is alumina.

12. The method of claim 10 further comprising a fluidly connected wet scrubber arranged between said fan and said stack for passage and further treatment of cleaned gas.

13. The method of claim 10 wherein said adsorbent removed by said separator device is recycled to said electrolytic cell.

14. The method of claim 10 wherein said dust and adsorbent collected by said filter are used in said first contact reactor.

15. The method of claim 10 wherein said vibration dampers reduce fan vibration by approximately 90 percent.

16. The method of claim 10 wherein said vibration dampers comprise a plurality of seal springs or rubber components.

17. The method of claim 10 wherein the first contact reactor is for removal of at least a portion of hydrogen fluoride and sulphur dioxide in said effluent gases with the adsorbent.

18. The method of claim 10 wherein the one or more second contact reactors are for removal of at least a portion of hydrogen fluoride and sulphur dioxide in said effluent gases with the adsorbent.

* * * * *